United States Patent [19]
Devendorf et al.

[11] Patent Number: 6,009,740
[45] Date of Patent: Jan. 4, 2000

[54] SYSTEM AND METHOD FOR DEADWEIGHT CALIBRATING A DYNAMOMETER

[75] Inventors: David P. Devendorf, Oceanside; Richard Vetter, Yorba Linda; Shinji Noguchi, Irvine; Tennyson Kwok, Glendora, all of Calif.

[73] Assignee: Horiba Instruments, Inc., Irvine, Calif.

[21] Appl. No.: 09/029,030

[22] PCT Filed: Feb. 21, 1998

[86] PCT No.: PCT/US98/03299

§ 371 Date: Feb. 21, 1998

§ 102(e) Date: Feb. 21, 1998

[87] PCT Pub. No.: WO98/37394

PCT Pub. Date: Aug. 27, 1998

Related U.S. Application Data

[60] Provisional application No. 60/038,449, Feb. 21, 1997.

[51] Int. Cl.[7] ....................................................... G01L 1/00
[52] U.S. Cl. ............................................................... 73/1.13
[58] Field of Search .................................... 73/1.08, 1.09, 73/1.11, 1.13, 865.6

[56] References Cited

U.S. PATENT DOCUMENTS 4,637,481   1/1987   Shoemaker ................................ 73/1.13

FOREIGN PATENT DOCUMENTS 000970155   10/1982   U.S.S.R. .................................. 73/1.13

*Primary Examiner*—Robert Raevis
*Attorney, Agent, or Firm*—Brooks & Kushman P.C.

[57] ABSTRACT

A system and method for deadweight calibrating a dynamometer having an output indicative of a motor action is provided. A weight cart has a base and defines a working axis non-parallel to the base. A hanger arm is adjustably mounted to the weight cart for movement relative to the weight cart along the working axis. The hanger arm has a loading surface for holding a plurality of calibration weights. The hanger arm loading surface is configured with respect to a loading surface on a dynamometer calibration arm such that movement of the hanger arm incrementally places the calibration weight on the calibration arm loading surface to simulate motor action and allow calibration of the dynamometer.

13 Claims, 3 Drawing Sheets

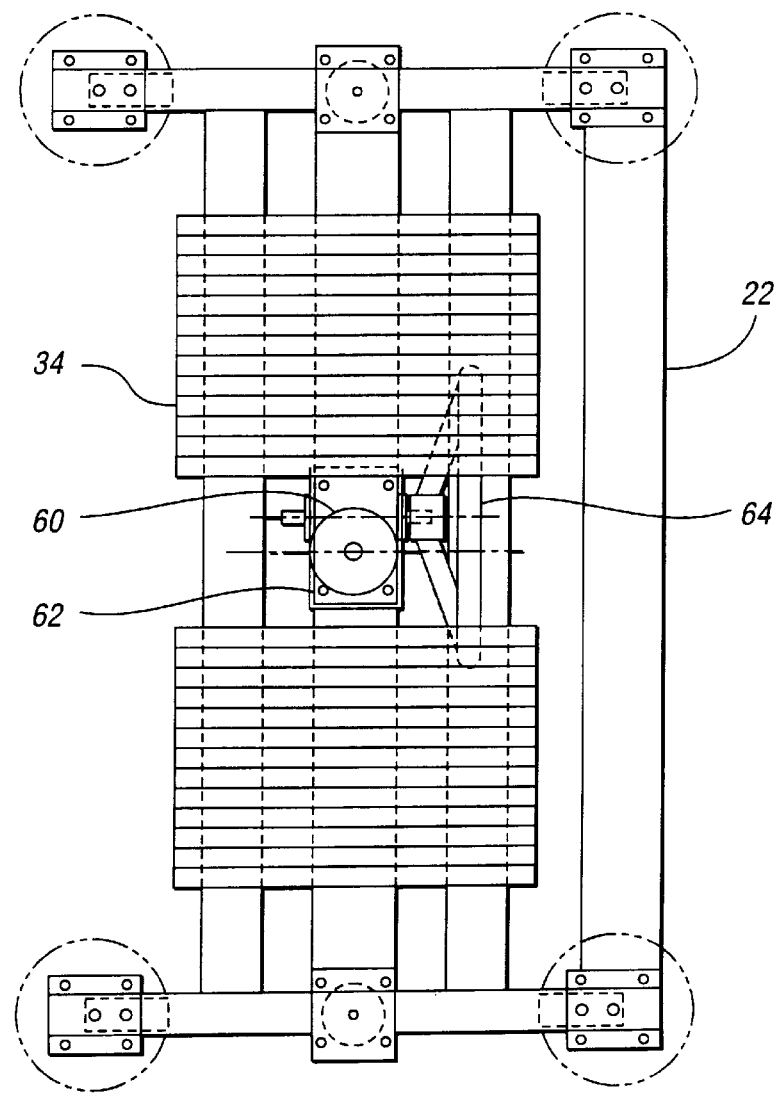
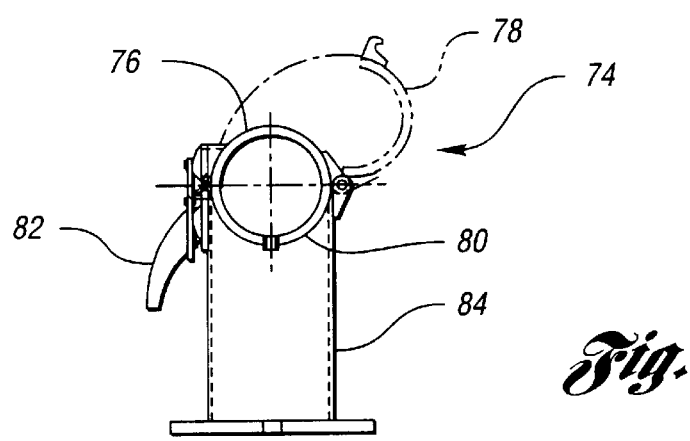

SYSTEM AND METHOD FOR DEADWEIGHT CALIBRATING A DYNAMOMETER

This application claims benefit of provisional Application Ser. No. 60,038,449 filed Feb. 21, 1997.

TECHNICAL FIELD

This invention relates to a system and method for incrementally applying weights to a dynamometer to calibrate the dynamometer in a fast, safe and accurate manner.

BACKGROUND

Chassis dynamometers are used in a wide variety of applications, particularly in connection with the testing of motor vehicle engine emissions pursuant to Environmental Protection Agency (EPA) emissions regulations for motor vehicles. Such dynamometers typically incorporate one or more "rolls" which are driven by one or more wheels of a test vehicle. The rolls are typically coupled to an input shaft of some form of power absorption, or exchange device which provides a controlled degree of rolling resistance to the rolls to simulate load and inertia forces normally encountered during vehicle operation. A vehicle engine must overcome inertia forces in order to accelerate or decelerate the vehicle. The engine must also overcome breakaway frictional and rolling frictional forces, as well as adapt to wind forces, generally referred to as road load forces. Dynamometers are designed to simulate the conditions that a vehicle is faced with during actual road operation.

In an effort to ensure that the dynamometer accurately measures torque, exhibits little hysteresis, and accounts for drift, calibration of the dynamometer is required on a periodic basis.

A dynamometer's torque measuring system may be calibrated using the deadweight method. The deadweight method applies known torques on the dynamometer calibration arm, against which the dynamometer output is calibrated. The known torques are produced by calibration weights. Accordingly, a series of calibration weights are applied to a calibration arm or arbor and weight hanger to simulate positive and negative torques. Unfortunately, since the dynamometer is located below the floor level of the test cell in a confined space, the application of the weights onto the calibration arm is an awkward and potentially hazardous process.

With previous dynamometer designs, calibration of the dynamometer required a person to lower, for instance, 50 pound weights, into a confined space, and then subsequently place the weights one at a time on the weight hanger for incremental calibration. The calibration operator would incrementally place weight on the hanger to simulate the varying loads applied during vehicle testing. As an example, for dynamometers testing light-duty vehicles, weights in the range of 650 pounds would have to be applied to the calibration hanger. For complete calibration, an incremental weight, for example 50 pounds, is applied to the calibration hanger, after which the calibration weight is steadied on the calibration arm to obtain a stable reading. For each incremental weight up to the recommended total weight, for example 650 pounds, a calibration reading is taken.

Accordingly, for each of these calibration weights, under the previous designs, a calibration operator would have to carry the calibration weight, for example 50 pounds, and place it on the calibration hanger, until the desired load, for example 650 pounds, was attained. These calibration designs thus posed a significant safety hazard to the employees in charge of calibration, as this process required lifting, sliding and manipulating a substantial amount of weights, with the constant danger of back or other related injuries resulting from the heavy load and strain. In view of this awkward, time-consuming and straining procedure, calibrations of dynamometers were only done when absolutely necessary.

SUMMARY OF THE INVENTION

It is, therefore, an object of the present invention to provide a system and method for deadweight calibrating a dynamometer that eliminates the requirements of manual weight manipulation.

It is another object of the present invention to provide a system and method for deadweight calibrating a dynamometer that is simple, accurate, and safe.

In carrying out the above objects and other objects and features of the present invention, a system for deadweight calibrating a dynamometer is provided. The system comprises a weight cart having a base and defining a working axis non-parallel to the base. A hanger arm adjustably mounted to the weight cart is movable relative to the weight cart along the working axis. The hanger arm has a loading surface for holding a plurality of calibration weights. The hanger arm loading surface is configured with respect to a loading surface on a dynamometer calibration arm such that movement of the hanger arm incrementally places the calibration weights on the calibration arm loading surface to simulate motor action. The simulated motor action allows calibration of the dynamometer. Preferably, the working axis is generally perpendicular to the base.

In a preferred embodiment, the system further comprises a screw type actuator including an elongate screw affixed to the weight cart and oriented along the working axis. The hanger arm is raised and lowered along the screw by actuation of the screw type actuator. Controlled raising and lowering of the hanger arm may be affected by a gear reduction assembly having an output connected to the screw, and an input connected to a flywheel or selectively drivable motor.

Further, in a preferred embodiment, the hanger arm loading surface defines a plurality of steps. Each step holds an individual calibration weight. Movement of the hanger arm causes incremental removal or placement of the individual calibration weights onto the calibration arm loading surface.

Further, in carrying out the present invention, a method for deadweight calibrating a dynamometer is provided. The method comprises positioning a weight cart adjacent a calibration arm on the dynamometer, positioning a hanger arm for movement relative to the weight cart, and controllably moving the hanger arm with respect to the weight cart along a working axis to incrementally place calibration weights on the calibration arm loading surface of the dynamometer.

The advantages accruing to the present invention are numerous. For example, embodiments of the present invention eliminate the requirement of manual weight manipulation. Further, embodiments of the present invention provide simple, accurate, and safe dynamometer calibration techniques. Still further, embodiments of the present invention are extremely advantageous for chassis dynamometers which are located in a pit. With a calibration arm located above the pit, and a weight cart to hold the weights in a convenient and safe manner, the chassis dynamometer may be calibrated without the need for a person to lift, slide or manipulate any of the weights, or enter the pit.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a plan view of the weight cart of FIG. 1; and

FIG. 4 is a cross-sectional view of the attachment device for the above-pit loading beam and calibration arm.

BEST MODE FOR CARRYING OUT THE INVENTION

The deadweight cart of the present invention eliminates the need for a dynamometer operator to manipulate significant loads in an effort to calibrate the chassis dynamometer.

While this deadweight cart is designed in conjunction with the calibration of the chassis dynamometer, the same calibration cart can be modified in terms of height and positioning to provide a calibration deadweight assembly for use in conjunction with a variety of dynamometers, such as a fluid dynamometer, an absorption dynamometer and the like.

In general, during calibration, known torques are applied to the dynamometer by placing known reference masses at known distances. The dynamometer measures the applied torque. The measured torques are compared to the known torques to calibrate the dynamometer outputs.

To remove the need for operator control of the calibration weights, a deadweight calibration cart was designed to hold the weights for calibration purposes and facilitate transportation of the weights from one test site to another. The cart is preferably a steel frame structure mounted on casters and is preferably sized such that it can roll through a standard 36 inch wide door. The casters are most preferably 4" diameter swivel casters which can withstand the deadweight load. Each caster would most preferably have a 600-lb. capacity. The cart is designed to carry the calibration weights preferably, 26 steel calibration weights, the weights being hung on a specially stepped hanger with two arms.

Figure 1:
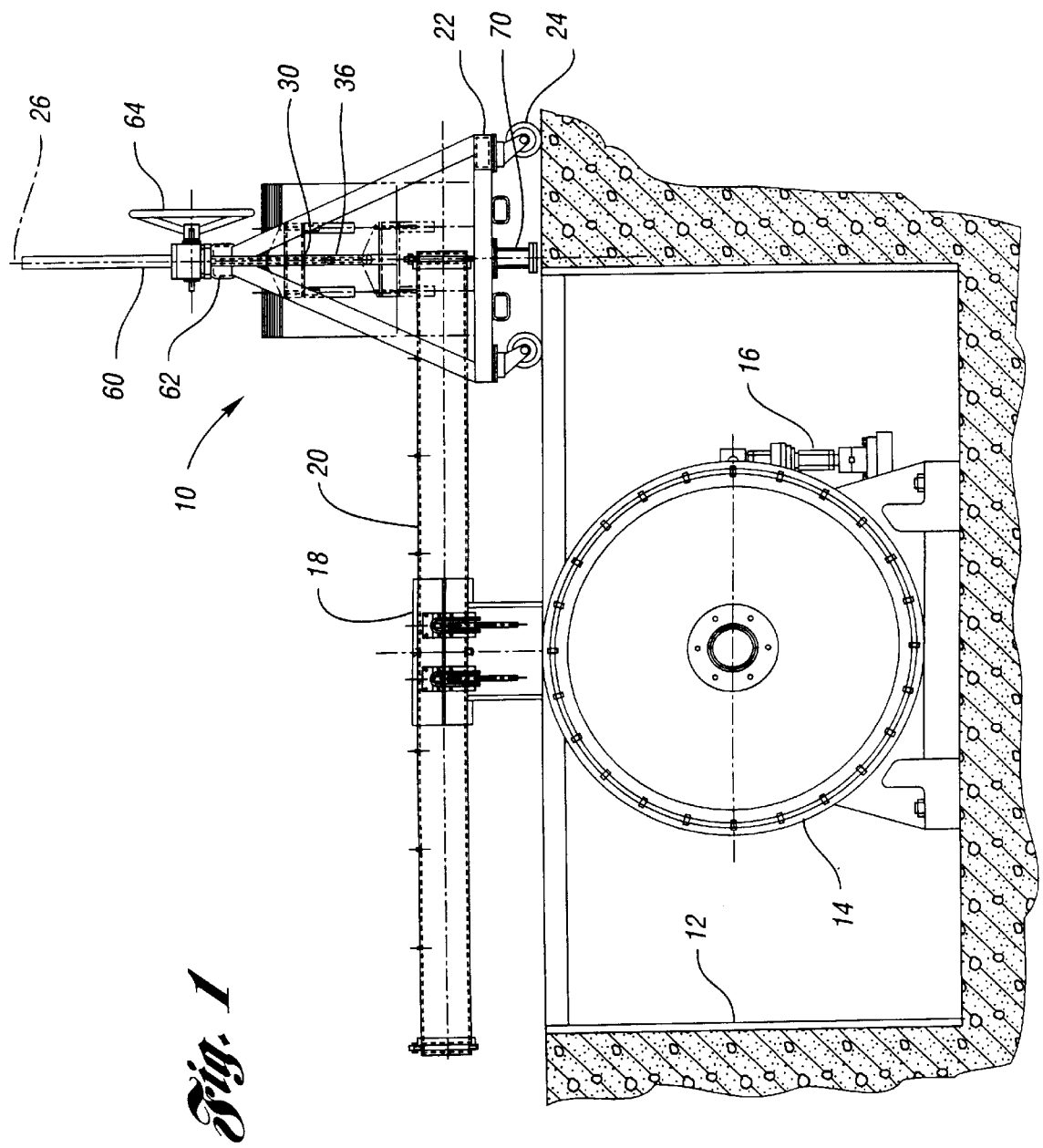
FIG. 1 is a schematic diagram illustrating a chassis dynamometer, above-pit calibration arm, and weight cart, in accordance with the present invention.

With reference to FIG. 1, a system for deadweight calibrating a dynamometer having an output indicative of a motor action, is illustrated. The system includes a weight cart 10 for placing or removing calibration weights from the dynamometer calibration arm. As illustrated, a pit 12 contains a dynamometer 14. The dynamometer 14 is shown as a chassis dynamometer; however, embodiments of the present invention may be employed for calibrating other types of dynamometers. The dynamometer output is preferably indicated by load sensor 16.

Generally, the dynamometer 14 includes a rotatably mounted stator with separately excited field windings. An armature is mounted for rotation relative to the stator. When the armature rotates, the armature windings experience a force acting on them, called motor action. The direction of the force is such that it tends to resist the rotation of the armature. Because the stator is free to rotate, it is pulled around equally by the motor action. The stator is retained by, for example, load sensor 16. Thus, in a chassis dynamometer test, the sensor output is indicative of vehicle torque output.

An adjustment mechanism 18 affixes loading beam 20 to dynamometer 14. The adjustment mechanism 18 allows positioning of loading beam 20 at various heights above pit 12.

Figure 2A:
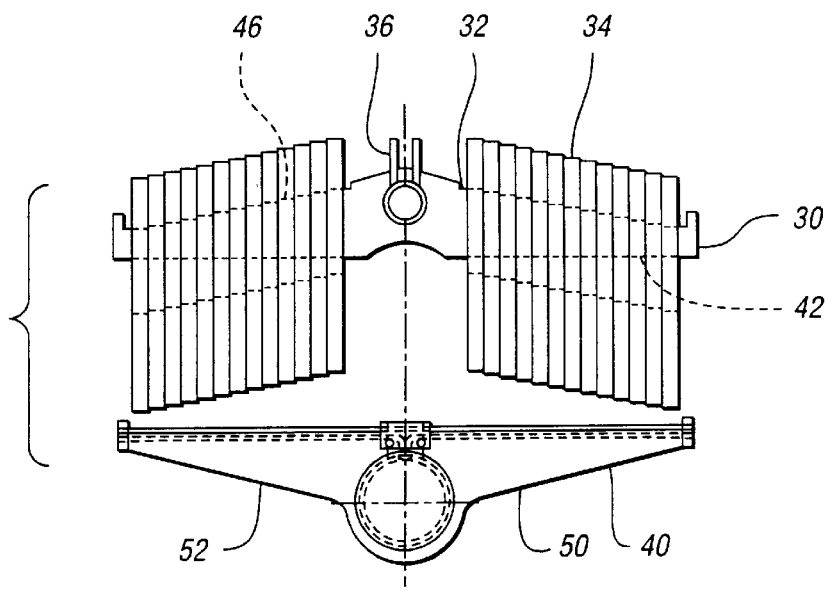
FIGS. 2A through 2C are enlarged views of the hanger arm of the weight cart shown in FIG. 1, illustrating incremental calibration weight placement.
Figure 2B:
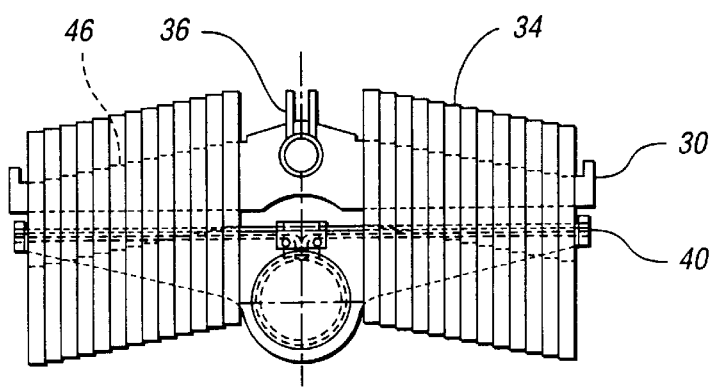
Figure 2C:
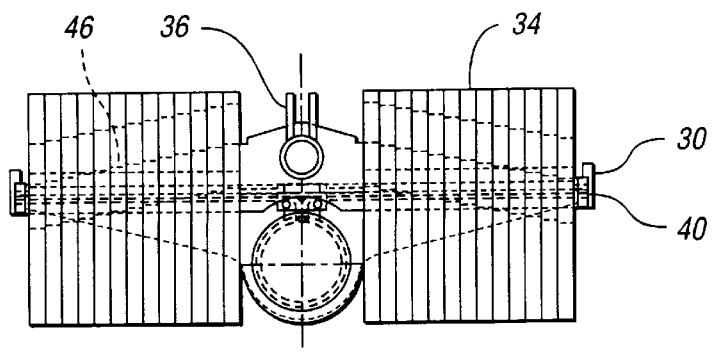

The weight cart 10 includes a base 22 mounted on casters 24. A working axis 26 is non-parallel to the base 22, and is preferably generally perpendicular to the base 22. A hanger arm 30 is adjustably mounted to the weight cart 10 for movement relative to the weight cart 10 along the working axis 26. As best shown in FIGS. 2A through 2C, the hanger arm 30 has a loading surface 32 for holding a plurality of calibration weights 34.

Preferably, the hanger arm 30 includes a first arm member 42 extending outwardly in a first direction away from the working axis, and a second arm member extending outwardly in a second direction away from the working axis. Both the first and second arm members define first and second loading surfaces respectively.

The calibration arm 40 also has a loading surface for receiving the calibration weights, incrementally. Preferably, the calibration arm 40 includes a first arm member 50 extending outwardly in a first direction away from the working axis, and a second arm member 52 extending outwardly in a second direction away from the working axis. Both the first and second arm members define first and second loading surfaces, respectively. As best shown in FIGS. 2A through 2C, the use of more than one calibration arm extending member facilitates symmetric loading of the dynamometer calibration arm.

To facilitate calibration of the dynamometer, the hanger arm loading surface is configured with respect to the calibration arm loading surface such that movement of the hanger arm 30 incrementally places calibration weights on the calibration arm loading surface to simulate motor action.

The loading surface on the weight cart hanger arm and loading surface on the calibration arm each define a plurality of steps 46 for receiving individual calibration weights. This is best illustrated in FIGS. 2A through 2C, which shows steps 46 on the loading surface 32, and on the dynamometer calibration arm loading surface.

With continuing reference to FIGS. 1 through 3, primarily to FIG. 3, the hanger arm 30 is preferably moved by a screw type actuator 36. Screw type actuator 36 includes an elongated screw 60, gear reduction assembly 62, and flywheel 64. A user may simply rotate the flywheel 64, which undergoes significant gear reduction at gear reduction assembly 62, to advance or retract the elongated screw 60 to move the hanger arm 30. In one embodiment, after placement of the first calibration weight, an additional calibration weight (or pair of calibration weights in the embodiment illustrated in FIGS. 2A through 2C), is deposited on the calibration arm loading surface with every five full turns of flywheel 64.

Of course, it is to be appreciated that there are many different actuators that may be employed to achieve embodiments of the present invention. For example, flywheel 64 may be replaced with a selectively drivable motor to fully automate the weight loading and unloading process. Preferably, a floor lock 70 (FIG. 1) is mounted to weight cart 10 for securing weight cart 10 to a work place floor adjacent the dynamometer 14.

With reference to FIG. 4, securing of the loading beam 20 to the attachment mechanism 18 (FIG. 1) is illustrated. A clamping assembly 74 includes a first swing adapter 76 shown in the closed position at 76, and shown in the open position, in phantom, at 78. The other adapter half 84 cooperates with adaptor half 76 to secure the loading beam.

A threaded or other suitable type adjustment mechanism 84 allows for height adjustment of the loading beam relative to the pit surface. A toggle clamp 82 is used to secure the adaptor halves 76 and 80 in place during dynamometer calibration.

Further in accordance with the present invention, a method for deadweight calibrating a dynamometer having an output indicative of a motor action is provided. First, a worker positions the weight cart adjacent to the calibration arm on the dynamometer. A hanger arm is positioned for movement relative to the weight cart along the working axis. The user controllably moves the hanger arm with respect to the weight cart along the working axis. The controlled movement of the hanger arm, as demanded by the user, incrementally places the calibration weights on the calibration arm loading surface to simulate motor action and allow calibration of the dynamometer.

In operation, the hanger is preferably raised and lowered with a 2-ton Acme screw actuator, that allows an operator to raise and lower the hanger with weights simply by rotating the large wheel on the actuator. The preferred two-ton Acme screw actuator is a keyed 1" screw with an 18" stroke that allows 24 turns per inch and approximately 50 inches per pound at 15,000 pounds. In the preferred embodiment, it would for example take 24 turns of the wheel to raise or lower the weights one inch, using a very small amount of force on the wheel. In the preferred embodiment, the wheel utilized is large and heavy enough to act like a flywheel and aid in the movement of the weights, preferably with a handle to provide easy movement of the weights. With such a design, an operator can simply lower the weights by as much as 12 inches to get the weights off of the deadweight cart and above the calibration arm to start applying the weights on the hanger. A support frame is further recommended for the deadweight cart, for use in conjunction with transportation of the weights.

A unique feature of the calibration arm is the stepped hanger arms which facilitate progressive placement of the weights on the calibration arm. In the preferred embodiment, this hanger arm is accurately formed by using advanced processes such as water jet or laser cutting, in controlling the spacing of each stop of the hanger arms in an accurate fashion.

In operation, the deadweight cart would be rolled by an operator over to the side of the chassis dynamometer, and raised into an appropriate position. Once the cart is in an appropriate position, the floor lock positioned on the bottom end of the calibration cart is used to lock the deadweight cart to the floor to prevent unnecessary movement. The floor lock is preferably designed to be foot-operated and lock both sides of the cart in a fixed position. Once the deadweight cart is placed in a final position, the weights are progressively transferred onto the calibration arm. In an effort to ensure accurate placement of the weights, without any one weight touching an adjacent weight, the weights and the calibration arm have a specialized stepped design.

In the preferred embodiment, there are 26 weights used for calibration, each weight would preferably be a 50-lb. weight and thus the calibration deadweight assembly would have a total of 1,300 pounds. In an alternate embodiment, each calibration weight would have a 44-lb. load and thus 26 such weights would have a total of 1,144 pounds.

In the preferred embodiment, a one-piece loading beam is used, preferably a 6 inch×25 inch wall aluminum tube with 2-0.625 inch steel plate crossbars on either end, each 48 inches from the center. The crossbars are preferably 35½ inches wide and with a stainless steel 0.375 inch diameter round bar on the top edge, where the weights are set. Along the length of the loading beam, at 12 inch increments, 0.375 inch diameter dowel pins are preferably set to enable calibration of the arm length. Preferably, the full diameter of the 0.375 inch stainless steel weight support bar is exposed with a center for access to aid in calibration. The center point is preferably also a 0.375 inch diameter dowel pin pointing down to engage the 150 HP motor adapter for positioning the loading beam. The loading beam preferably does not exceed 88 pounds to facilitate handling of the beam by two calibration operators, unassisted.

A finite element analysis (FEA) was performed on the deadweight cart assembly to more precisely determine stress and deflection caused by the 1300 pound deadweight placed thereon. A maximum stress of 8038.85 psi was determined, and at the outboard-most load points on the crossbar a total vertical deflection of −0.2193 inches was determined. Since there are preferably 13 sets of weights positioned on each crossbar, each set of weights adds about 0.018 inch deflection to the overall system. In the preferred embodiment, the lifting beam is a welded lifting fixture with two "coat hanger" lifting crossbeams. The crossbeams are preferably stepped to allow a discrete number of weights, for example 13 sets, to be lowered onto the loading beam. The nominal steps are preferably 0.2 inches. Since the tolerance of the steps is important, machining after flame cutting is preferred. The final step height is preferably 0.190 inches. The figures were calculated by comparing the deflection of the loading beam, which increases as the weight is transferred onto it. The deflections of a lifting beam and loading beam, whose deflections are reduced as weight is transferred onto the loading beams, and the available actuator ratio is used to lower the load from the loading dolly.

The loading dolly is preferably a welded tubular steel structure mounted on preferably four inch casters. In the preferred embodiment, floor locks are recommended to affix the dolly in a final position. The loading dolly is preferably 30 inches by 44 inches, allowing the dolly to pass through standard 36 inch doorways. The overall weight of the dolly preferably without the deadweights is approximately 200 pounds.

In the preferred embodiment, a centrally located 2 ton capacity Acme screw actuator raises and lowers the lifting beam to accomplish weight transfer. For each input turn, the 2 ton actuator has a vertical travel of ¹⁄₂₄ inch (0.04167 inch). For every five turns, the screw travels 0.2083 inch. When the crossbar stops at 0.190, as in the preferred embodiment, the overall lifting system deflection is compensated for, and five turns causes the actuator to transfer the next pair of weights. Under a maximum load, approximately 50 inches per pound of input torque is required. Since about 12 inches of travel is required during positioning of the weights over the loading bar, approximately 288 turns at the input shaft is required.

As a result of this deadweight cart, the calibration weights can be added and removed two at a time to give 13 increments of weight to check linearity and hysteresis of the chassis dynamometer. Another advantage of this invention is that all of the weights can be added or removed from the hanger arm at one time to set gains. As both of these processes are required for calibration, such advantages are important from a practical standpoint to achieve an appropriate calibration of the chassis dynamometer. In sum, the use of this deadweight cart and associated hanger arm, reduces the previous time required for weight handling, decreasing the time required for calibration of the chassis dynamometer and thus increasing the availability of the dynamometer for testing, while improving the safety and accuracy of the calibration procedure.

Moreover, in view of this deadweight calibration cart, an operator does not need to repeatedly lift calibration weights and thus avoids the chance of back injury resulting therefrom. In addition, due to the manipulation of calibration weights, there is always the additional risk of a weight accidently dropping on an operator and for example injuring the operator's fingers, hands, toes or feet. With this invention, the calibration weights are changed by an operator simply by rotating the wheel, while standing, which thus eliminates the need to assume awkward positions to manipulate the calibration weights.

Furthermore, the use of the deadweight cart of the present invention allows a single operator to readily perform the deadweight calibration, which saves significant labor costs and improves the accuracy and repeatability of the chassis dynamometer.

In an alternate embodiment of this invention, the deadweight calibration cart screw actuator could include a stepper motor which would thus completely automate the deadweight process and altogether remove the need for a calibration operator. For this alternate embodiment, the height of the loading beam may require adjustment depending upon the dimensions of the motor adaptor, and in an effort to maintain load beam clearance at 12 AFL.

With the use of this calibration cart, the calibration weights are conveniently stored and can also be conveniently transported with the cart to provide for easy movement of the cart and any calibration weights when necessary.

In addition, the vertical motion of the Acme screw actuator provides precise positioning of the calibration weights and thus increases the accuracy and repeatability of the calibration. With the use of the screw actuator, human variations and oscillation variances caused from the addition or removal of calibration weights from the calibration arm are eliminated. In conjunction, the time required following an oscillation, time required for the arm to stabilize, is further decreased, as is the chance of error associated with the calibration weight oscillation.

While the best mode and viable alternate embodiments for carrying out the invention have been described in detail as shown on the drawings, those familiar in the art to which this invention relates will recognize various alternative designs and embodiments for practicing the invention as defined by the following claims.

What is claimed is:

1. A system for deadweight calibrating a dynamometer having an output indicative of a motor action, the system comprising:
   a weight cart having a base and defining a working axis non-parallel to the base; and
   a hanger arm adjustably mounted to the weight cart for movement relative to the weight cart along the working axis, and having a loading surface for holding a plurality of calibration weights,
   wherein the hanger arm loading surface is configured with respect to a loading surface on a dynamometer calibration arm such that movement of the hanger arm incrementally places the calibration weights on the calibration arm loading surface to simulate motor action and allow calibration of the dynamometer.

2. The system of claim 1 wherein the working axis is generally perpendicular to the base.

3. The system of claim 1 further comprising:
   a screw type actuator including an elongate screw affixed to the weight cart and oriented along the working axis to provide movement of the hanger arm along the working axis, wherein the hanger arm is raised and lowered along the screw by actuation of the screw type actuator.

4. The system of claim 3 further comprising:
   a flywheel; and
   a gear reduction assembly having an input connected to the flywheel, and an output connected to the screw to cause controlled raising and lowering of the hanger arm when the flywheel is rotated.

5. The system of claim 1 wherein the hanger arm loading surface defines a plurality of steps, each step holding an individual calibration weight, such that movement of the hanger arm causes incremental removal or placement of the individual calibration weights onto the calibration arm loading surface.

6. The system of claim 1 wherein the hanger arm further comprises:
   a first arm member extending outwardly in a first direction away from the working axis, the first arm member having a first loading surface; and
   a second arm member extending outwardly in a second direction away from the working axis, the second arm member having a second loading surface,
   wherein calibration weights are placed on the first and second arm members such that the calibration weights may be placed on first and second corresponding loading surfaces on the dynamometer calibration arm to symmetrically load the calibration arm.

7. The system of claim 1 wherein the dynamometer is a pit dynamometer, and the system further comprises:
   a loading beam affixed to the dynamometer to provide at least one calibration arm, the loading beam being located above the pit to facilitate dynamometer calibration.

8. The system of claim 7 wherein the at least one calibration arm loading surface defines a plurality of steps, each step receiving an individual calibration weight.

9. The system of claim 7 wherein the loading beam is affixed to the dynamometer by an adjustment mechanism that allows adjustment of loading beam position relative to the dynamometer.

10. The system of claim 1 further comprising:
    a floor lock mounted to the weight cart for securing the weight cart to a workplace floor adjacent to the dynamometer.

11. The system of claim 1 further comprising:
    a pair of wheels mounted to the weight cart to facilitate transportation thereof.

12. A method for deadweight calibrating a dynamometer having an output indicative of a motor action, the method comprising:
    positioning a weight cart adjacent a calibration arm on the dynamometer, the weight cart having a base and defining a working axis non-parallel to the base;
    positioning a hanger arm for movement relative to the weight cart along the working axis, the hanger arm having a loading surface for holding a plurality of calibration weights; and
    controllably moving the hanger arm with respect to the weight cart along the working axis, wherein the hanger arm loading surface is configured with respect to a loading surface on the dynamometer calibration arm such that movement of the hanger arm incrementally places the calibration weights on the calibration arm loading surface to simulate motor action and allow calibration of the dynamometer.

13. The method of claim 12 wherein the dynamometer is a pit dynamometer, and the method further comprises:

affixing a loading beam to the dynamometer to provide at least one calibration arm, the loading beam being located above the pit to facilitate dynamometer calibration.

* * * * *